United States Patent [19]

Ewing

[11] Patent Number: 4,869,280

[45] Date of Patent: Sep. 26, 1989

[54] COLLAPSIBLE CRUTCH

[76] Inventor: Joseph Ewing, 8245 Peach Orchard Rd., Dundalk, Md. 21222

[21] Appl. No.: 214,597

[22] Filed: Jul. 1, 1988

[51] Int. Cl.⁴ .............................................. A61H 3/02
[52] U.S. Cl. ....................................... 135/69; 135/71; 135/74
[58] Field of Search ..................... 135/69, 71, 75, 74, 135/114

[56] References Cited

U.S. PATENT DOCUMENTS

| | | | |
|---|---|---|---|
| Re. 28,067 | 7/1974 | Hyman | 135/74 |
| 2,705,015 | 3/1955 | Langlais | 135/114 |
| 3,635,233 | 1/1972 | Robertson | 135/71 |
| 3,710,807 | 1/1973 | Ferry | 135/71 |
| 3,730,544 | 5/1973 | Hyman | 135/114 |
| 4,437,480 | 3/1984 | Husa | 135/74 |

FOREIGN PATENT DOCUMENTS

| | | | |
|---|---|---|---|
| 197027 | 4/1957 | Austria | 135/74 |
| 338151 | 5/1904 | France | 135/74 |
| 98563 | 7/1961 | Norway | 135/114 |
| 410808 | 5/1934 | United Kingdom | 135/46 F |

Primary Examiner—Henry E. Raduazo
Attorney, Agent, or Firm—Robert C. Kain, Jr.

[57] ABSTRACT

The collapsible crutch includes an elongated head section, at least upper and lower elongated, hollow midsections, and an elongated foot section. The head section has a mechanism for supporting a portion of the person using the crutch. The midsections are connected together by an elastic cord. A detachable coupler connects the head section to the upper midsection and a similar detachable coupler connects the lower midsection to the foot section. In an assembled mode, these sections are substantially axially aligned. The collapsible crutch also includes a coupling mechanism that provides a conjoined, axially and laterally stable, subassembly of the upper and lower midsections.

17 Claims, 2 Drawing Sheets

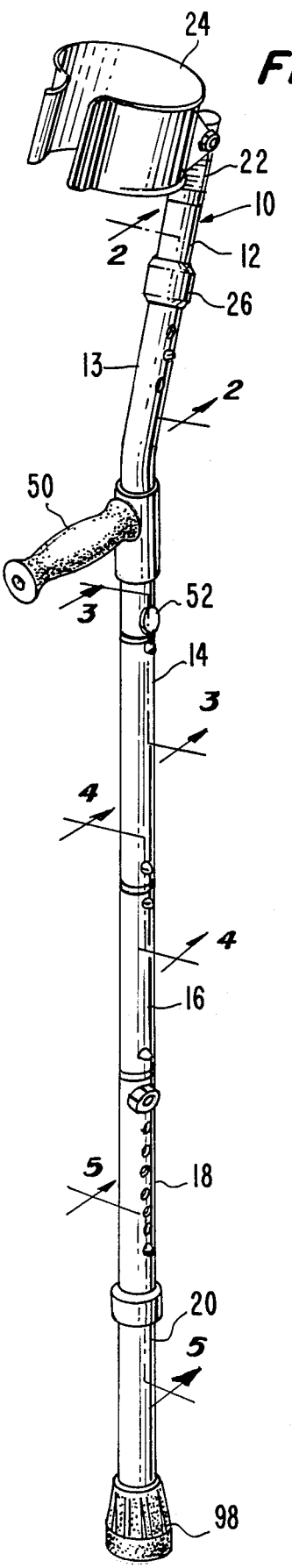
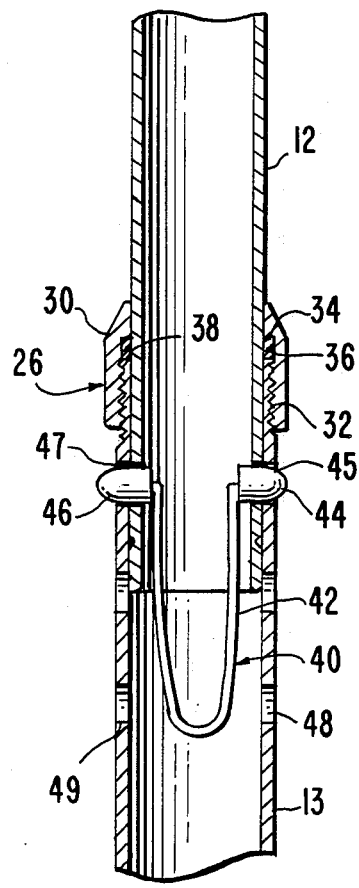
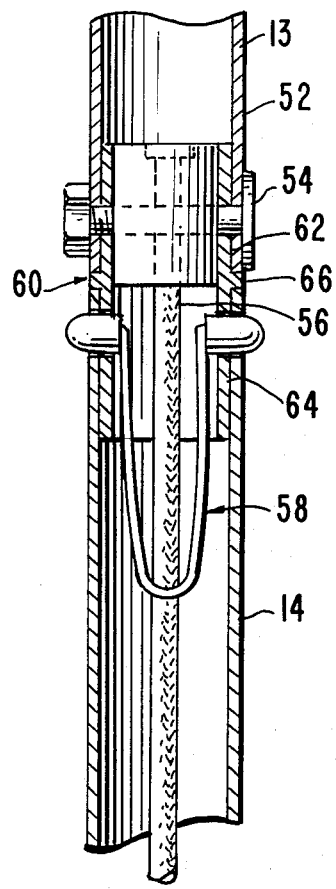
FIG. 1.
FIG. 2. PRIOR ART
FIG. 3.

FIG. 4.
FIG. 5.
PRIOR ART
FIG. 6.
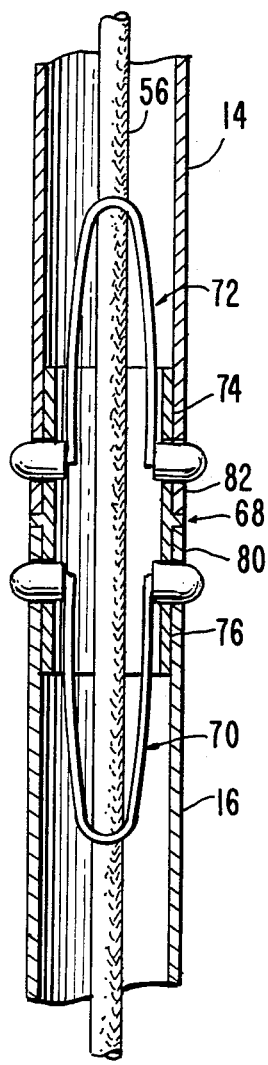
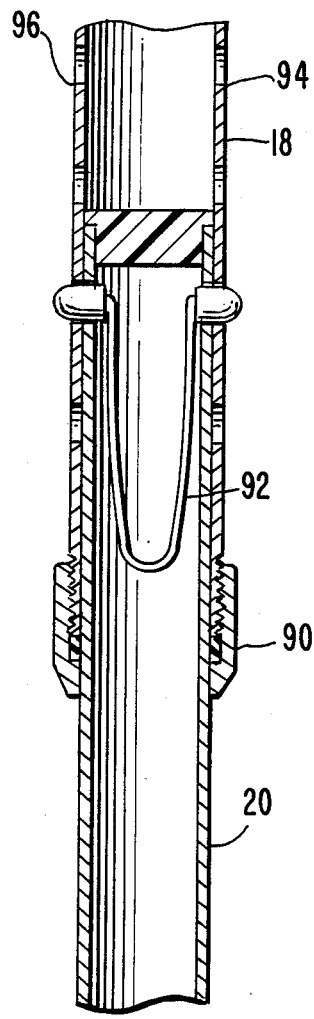
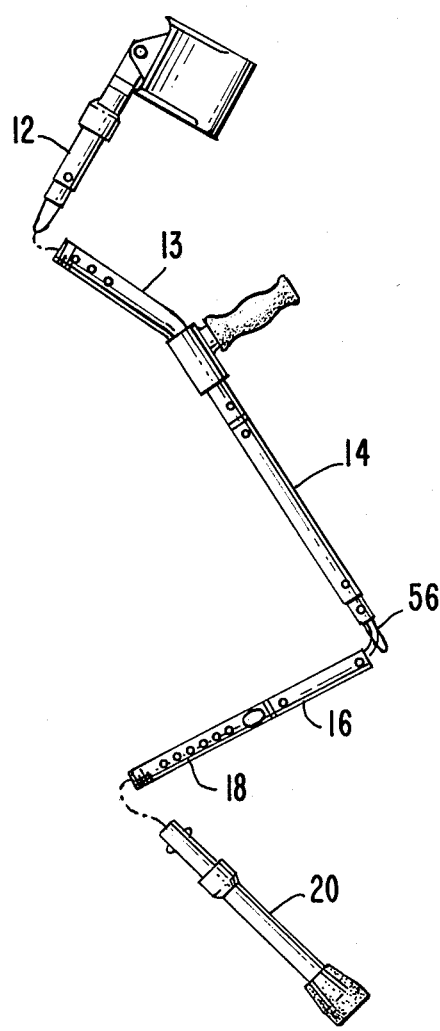

COLLAPSIBLE CRUTCH

BACKGROUND OF THE INVENTION

The present invention relates to a collapsible crutch.

A person using a crutch usually has difficulties in storing the crutch when the person sits down. More importantly, the crutch may become a hazard to other individuals if that person is sitting in a public place, such as a restaurant, bus or airport. Therefore, it would be beneficial to have a crutch whose length can be reduced when the crutch is not in use. One prior art crutch includes slide mechanisms along its axial length which permit the crutch to collapse to approximately 26" long.

OBJECTS OF THE INVENTION

It is an object of the present invention to provide a collapsible crutch wherein the midsections of the crutch are coupled together by elastic such that they can be folded.

It is another object of the present invention to provide a collapsible crutch which has couplings that conjoin sections of the crutch together and substantially eliminate lateral movement.

It is a further object of the present invention to provide safety locks between the couplers and the crutch sections thereby limiting axial movement of the crutch pieces.

It is another object of the present invention to provide a crutch that can be broken apart and folded into a compact structure approximately 10" long.

SUMMARY OF THE INVENTION

The collapsible crutch includes an elongated head section, at least upper and lower elongated, hollow midsections, and an elongated foot section. The head section has a mechanism for supporting a portion of the person using the crutch. The midsections are connected together by a elastic cord. A detachable coupler connects the head section to the upper midsection and a similar detachable coupler connects the lower midsection to the foot section. In an assembled mode, these sections are substantially axially aligned. The collapsible crutch also includes a coupling mechanism that provides a conjoined, axially and laterally stable, subassembly of the upper and lower midsections.

BRIEF DESCRIPTION OF THE DRAWINGS

Further objects and advantages of the present invention can be found in the detailed description of the preferred embodiment when taken in conjunction with the accompanying drawings in which:

FIG. 1 is a perspective view of the collapsible crutch in a fully assembled mode;

FIG. 2 is a cross-section of one joint of the crutch from the perspective of section line 2'—2" in FIG. 1;

FIG. 3 is a cross-sectional view of the joint between the first and second midsections from the perspective of section line 3'—3" in FIG. 1;

FIG. 4 is a cross-section of the joint between the second and third midsections from the perspective of section line 4'—4" in FIG. 1;

FIG. 5 is a cross-sectional view of the joint between the foot section and the fourth midsection from the perspective of section line 5'—5" in FIG. 1; and FIG. 6 is a view of the crutch in a partially disassembled, axially discontinuous mode.

DETAILED DESCRIPTION OF THE PREFERRED EMBODIMENT

The present invention relates to a collapsible crutch. FIG. 1 illustrates a perspective view of collapsible crutch 10. The crutch includes an elongated head section 12, a first or upper midsection 13, a second midsection 14, a third midsection 16, a fourth midsection 18, and a foot section 20. All these sections are elongated and, in an assembled mode as shown in FIG. 1, are generally axially aligned to provide a support structure for the person using the crutch.

At terminal end 22 of head section 12, a support mechanism 24 is attached to the head section. The support mechanism as shown in FIG. 1 is a cuff which generally circumscribes the arm of the person using the crutch. Therefore, the support mechanism provides support for a portion of the person using the crutch. Head section 12 is attached to first midsection 13 by a means for detachable mounting 26. Detachable mounting 26 is shown in detail in FIG. 2. FIG. 2 shows that head section 12 is a hollow, elongated tube as is first midsection 13. Detachable mounting 26 includes a threadable clasp 30 that threads onto male threads on the outer, upper, terminal end region 32 of midsection 13. Clasp 30 includes an internal shoulder 34 in which is disposed a resilient stop member 36 that acts against end 38 of section 13. Generally, threadable clasp 30 is tightened onto the male threads in region 32 and the axial length of resilient stop member 36 is made smaller. The stop member then transforms the axial forces into radially directed forces acting on head section 12. These radially directed forces lock head section 12 to midsection 13. To further insure that there is no movement, a latch mechanism 40 is utilized. In this embodiment, the latch mechanism includes a spring 42 having ends which acts on buttons 44 and 46. The buttons extend through holes 45 and 47 that pass through both head section 12 and midsection 13. The overall height of crutch 10 can be adjusted by loosening clasp 30 and depressing pins 44 and 46 such that the pin ends do not extend through passages 45 and 47 through midsection 13. Head section 12 can be axially adjusted with respect to midsection 13 by placing pins 44 and 46 in other holes such as holes 48 and 49 and tightening clasp 30.

Other mechanisms can be used instead of the illustrated latch means 40. For example, a single pin radially biased outward would be sufficient. In this situation, a simple coil spring, mounted on a shoulder stop extending from the inside wall of head section 12 into a central region, would force a pin through a hole in the opposite side of the head section.

FIG. 1 also shows that first midsection 13 includes a hand hold 50. FIG. 3 illustrates the lower end 52 of midsection 13. A mounting mechanism 54 is provided for an elastic cord 56 that runs through the interior of midsections 13, 14, 16 and 18. Midsections 13 and 14 are joined together not only by a latching means 58, which is similar to latching means 40 described above with respect to FIG. 2, but also with a coupler 60. Mounting mechanism 54 is retained within the coupler. Coupler 60 includes upper extension 62 that closely fits within the interior lower end region of head section 13. Coupler 60 also includes a lower extension 64 that closely fits within the upper interior terminal end region of midsection 14. Therefore, the coupler conjoins the midsections. Separating the upper and lower extensions of coupler 60 is a land 66 that interfaces between the terminal ends of sections 13 and 14. Latch mechanism 58 extends through lower extension 64 of coupler 60 as well as the upper region of midsection 14. Elastic or bungee cord 56 extends through the interior of coupler 60 as well as the interiors of sections 13 and 14.

FIG. 4 shows a cross-sectional view of the joint between midsections 14 and 16. Coupler 68 is generally similar to coupler 60 described above with respect to FIG. 3 except that in addition to having latching mechanism 70, the coupler also interacts with latching mechanism 72. These two latching mechanisms, together with upper and lower extensions 74 and 76 of coupler 68, insure that midsections 14 and 16 are conjoined such that they meet and overlap vis a vis coupler 68. Of course, the collapsible crutch could be made simpler by having upper end 80 of midsection 16 fit into the interior of lower end 82 of midsection 14. In that event, the upper and lower regions of the midsections would provide the coupling mechanism. In general, the purpose of elastic cord 56, the couplers and latching mechanisms 40, 58, 70 and 72 is to insure that when the crutch is disassembled, the midsections stay in order and can be folded with respect to one another, and also if the elastic cord should break, the latch mechanisms and the couplers can be utilized to assemble the crutch.

FIG. 5 illustrates a cross-sectional view of the lowest joint between midsection 18 and foot section 20. These sections are joined by threadable clasp 90 and locked together by latch mechanism 92. Threadable clasp 90 is similar to threadable clasp 26 discussed above with respect to FIG. . In a similar fashion to the head section and first midsection, the foot section and the lower or last midsection can be adjusted with respect to each other such that the overall size of the crutch can be adjusted. This is accomplished by loosening threadable clasp 90 and removing the pins from the latching mechanism and moving those pins such that they protrude from other holes, for example holes 94 and 96 in midsection 18. At the bottom of foot section 20 (FIGS. 1 and 6), a rubber crutch end 98 provides a lower terminal end that is adapted to support the crutch in the fully assembled mode. FIG. 6 shows a partially disassembled crutch wherein head section 12 has been detached from midsection 13 and foot section 20 has been detached from midsection 18. It is important to note that midsections 1 and 16 have been uncoupled and that elastic cord 56 connects those midsections together and permits the midsections to be folded with respect to each other. The joint between sections 13 and 14 and 16 and 18 can also be uncoupled. In one embodiment, a collapsible crutch of the present invention can be folded into an approximately 10" compact assemblage such that it can be put into a purse, tote bag or luggage. This figure shows that the crutch can be axially discontinuous when all the joints are uncoupled or detached.

The claims appended hereto are meant to cover modifications and changes within the scope and spirit of the present invention.

What is claimed is:

1. A collapsible crutch for a person comprising:
   an elongated head section having, at its upper terminal end, means for supporting a portion of said person;
   at least upper and lower elongated, hollow midsections;
   first means for detachable mounting a lower end of said head section to an upper end of said upper midsection;
   elastic means coupling said upper and lower midsections together, said elastic means extending through an interior region in both said upper and lower midsections;
   coupling means having an upper extension that is adapted to be inserted into and closely fitted to an interior, lower terminal end region of said upper midsection, said coupling means having a lower extension that is adapted to e inserted into and closely fitted to an interior, upper terminal end region of said lower midsection, said elastic means extending through said coupling means, said coupling means substantially axially aligning said upper and lower midsections when inserted therein;
   means for respectively latching said upper and lower extensions of said coupling means to said upper and lower midsections, said means for latching includes at least one pin passing through holes in one of the closely fit extensions and midsections;
   a hand hold on one of said upper or said lower midsections;
   an elongated foot section having a lower terminal end adapted to support the crutch in a fully assembled mode, said foot section having an upper terminal end; and
   second means for detachably mounting said upper terminal end of said foot section to a lower terminal end of said lower midsection such that said lower midsection and said foot section are substantially axially aligned;
   whereby in said assembled mode, said head section, said upper and lower midsections, and said foot section define a substantially axially aligned support structure for said person and, in a collapsed mode, said head section, said upper and lower midsections, and said foot section form a compact assemblage.

2. A collapsible crutch as claimed in claim 1 including a further elongated, hollow midsection and a first and a second coupling means as said coupling means, said elastic means coupling said upper, lower and further midsections together, said first coupling means having first upper and lower extensions adapted to be respectively inserted, with a close fit, into said interior, lower terminal end region of said upper midsection and into said interior, upper terminal and region of said lower midsection, said second coupling means having second upper and lower extensions adapted to be respectively inserted, with a close fit, into said interior, lower terminal end region of said lower midsection and into an interior, upper terminal end region of said further midsection; the collapsible crutch including additional means for respectively latching said second upper and lower extensions to said lower terminal end of said lower midsection and to an upper terminal end of said further midsection; said second means for detachably mounting connecting a lower terminal end of said further midsection to said foot section.

3. A collapsible crutch as claimed in claim 1 including means for retaining said elastic means in said upper and lower midsections.

4. A collapsible crutch as claimed in claim 2 including means for retaining said elastic means in said upper and said further midsections.

5. A collapsible crutch as claimed in claim 2 wherein said interior end regions of said upper, said lower and said further midsections are sleeves that fit over said upper and lower extensions of said first and second coupling means.

6. A collapsible crutch as claimed in claim 2 wherein said head section, said upper, lower and further midsections and said foot section are tubular.

7. A collapsible crutch as claimed in claim 6 wherein said first and second coupling means each include a raised land between the upper and lower extensions, and the land having a top that is substantially flush with outer terminal end surfaces of the respective upper, lower and further midsections.

8. A collapsible crutch as claimed in claim 2 wherein said first and second coupling means are hollow, elongated structures.

9. A collapsible crutch as claimed in claim 1 wherein said means for latching includes a pair of pins, each pin passing through corresponding holes in one of the closely fit extensions and midsections, and said means for latching includes means for biasing said pair of pins outward way from said interior of said midsection.

10. A collapsible crutch as claimed in claim 2 wherein said means for latching includes a pair of pins, each pin passing through a corresponding hole in one of the closely fit extensions and midsections, and said means for latching includes means for biasing said pair of pins outward away from said interior of said midsection.

11. A collapsible crutch as claimed in claim 2 wherein said head section includes a lower terminal end region adapted to closely fit within an interior, upper terminal end region of said upper midsection.

12. A collapsible crutch as claimed in claim 2 wherein said first means for detachably mounting includes a threadable clasp that mounts on complementary threads on an outer, upper, terminal end region of said upper midsection, said clasp including an interior shoulder and a resilient stop member adapted to be forced against an upper terminal edge of said upper midsection and an adjacent portion of said head section.

13. A collapsible crutch as claimed in claim 2 wherein said foot section includes an upper terminal end region adapted to closely fit within an interior, lower terminal end region of said further midsection.

14. A collapsible crutch as claimed in claim 2 wherein said second means for detachably mounting includes a threadable clasp that mounts on complementary threads on an outer, lower terminal end region of said further midsection, said clasp including an interior shoulder and a resilient stop member adapted to be forced against a lower terminal edge of said further midsection and an adjacent portion of said foot section.

15. A collapsible crutch as claimed in claim 2 wherein said head section includes a lower terminal end region adapted to closely fit within an interior, upper terminal end region of said upper midsection, and said foot section includes an upper terminal end region adapted to closely fit within an interior, lower terminal end region of said further midsection.

16. A collapsible crutch as claimed in claim 15 including first and second means for respectively latching said head section to said upper midsection and said further midsection to said foot section.

17. A collapsible crutch as claimed in claim 16 wherein said first and second means for latching each include a pair of pins, each pin of said pair passing through corresponding holes in said head section and said upper midsection or in said foot section and said further midsection, said first and second means for latching each include means for biasing said pins outward away from the corresponding interior of said upper and further midsections.

* * * * *